(12) United States Patent
Kulkarni et al.

(10) Patent No.: US 10,572,908 B2
(45) Date of Patent: Feb. 25, 2020

(54) PREVIEW OF CONTENT ITEMS FOR DYNAMIC CREATIVE OPTIMIZATION

(71) Applicant: Facebook, Inc., Menlo Park, CA (US)

(72) Inventors: Aditya Pradip Kulkarni, Sunnyvale, CA (US); Avi Samuel Gavlovski, Kirkland, WA (US); Zhurun Zhang, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 331 days.

(21) Appl. No.: 15/397,549

(22) Filed: Jan. 3, 2017

(65) Prior Publication Data

US 2018/0189843 A1 Jul. 5, 2018

(51) Int. Cl.
*G06Q 30/02* (2012.01)

(52) U.S. Cl.
CPC ..... *G06Q 30/0276* (2013.01); *G06Q 30/0242* (2013.01); *G06Q 30/0244* (2013.01); *G06Q 30/0251* (2013.01); *G06Q 30/0255* (2013.01); *G06Q 30/0272* (2013.01); *G06Q 30/0277* (2013.01)

(58) Field of Classification Search
CPC ....................................... G06Q 30/0207–0277
See application file for complete search history.

(56) References Cited

U.S. PATENT DOCUMENTS

| 7,882,045 | B1 | 2/2011 | Cole et al. |
| 8,131,786 | B1 | 3/2012 | Benjio et al. |
| 8,401,899 | B1 | 3/2013 | Kauchak et al. |
| 8,738,436 | B2 | 5/2014 | Tuladhar et al. |
| 8,862,741 | B1 | 10/2014 | Tegtmeier et al. |
| 9,135,292 | B1 * | 9/2015 | Tsun .................... G06F 17/248 |

(Continued)

FOREIGN PATENT DOCUMENTS

| JP | 2014-215685 A | 11/2014 | |
| WO | WO 2005/045607 A2 * | 5/2005 | ............. G06Q 10/10 |

(Continued)

OTHER PUBLICATIONS

PCT International Search Report and Written Opinion, PCT Application No. PCT/US2017/037776, dated Sep. 25, 2017, 12 pages.

(Continued)

*Primary Examiner* — David J Stoltenberg
(74) *Attorney, Agent, or Firm* — Fenwick & West LLP

(57) ABSTRACT

An online system receives a set of creatives provided by a content provider, and presents one or more pseudo-assembled content items composed of the different combinations of the received creatives on a user interface to the content provider. A pseudo-assembled content item includes one or more creatives to be included in a final content item that are placed in their positions in the display interface, but the content item has not yet undergone assembly or creation. The positions of the creatives are defined by one or more placement rules provided by the content provider. The content provider can interact with the user interface to swap different creatives into the content item. The content provider can visually preview different content item candidates assembled from different permutations of creatives from the set of creatives of the content item before creating the final content item.

22 Claims, 10 Drawing Sheets

(56) References Cited

U.S. PATENT DOCUMENTS

| | | | |
|---|---|---|---|
| 9,317,812 B2 | 4/2016 | Kabiljo et al. | |
| 9,449,109 B1* | 9/2016 | Keel | G06F 16/9537 |
| 9,536,011 B1 | 1/2017 | Kirillov | |
| 9,760,910 B1* | 9/2017 | Tuchman | G06Q 50/01 |
| 10,387,902 B1* | 8/2019 | Ayars | G06Q 30/0211 |
| 10,423,977 B1* | 9/2019 | Ayars | G06Q 30/0243 |
| 2002/0194215 A1* | 12/2002 | Cantrell | G06Q 30/02 715/230 |
| 2003/0076350 A1* | 4/2003 | Vu | G06F 17/212 715/738 |
| 2003/0105589 A1 | 6/2003 | Liu et al. | |
| 2003/0191816 A1* | 10/2003 | Landress | G06Q 30/02 709/219 |
| 2004/0030726 A1* | 2/2004 | Baxter | G06F 17/2229 |
| 2004/0111432 A1 | 6/2004 | Adams et al. | |
| 2004/0117367 A1 | 6/2004 | Smith et al. | |
| 2004/0255245 A1* | 12/2004 | Yamada | G06F 17/212 715/246 |
| 2005/0251532 A1 | 11/2005 | Radhakrishnan et al. | |
| 2006/0200761 A1* | 9/2006 | Judd | G06F 16/951 715/202 |
| 2007/0022003 A1* | 1/2007 | Chao | G06Q 30/02 705/14.46 |
| 2007/0027901 A1 | 2/2007 | Chan et al. | |
| 2007/0050253 A1* | 3/2007 | Biggs | G06Q 30/02 705/14.67 |
| 2007/0050372 A1* | 3/2007 | Boyle | G06Q 30/02 |
| 2007/0156514 A1 | 7/2007 | Wright et al. | |
| 2007/0156621 A1 | 7/2007 | Wright et al. | |
| 2007/0260520 A1 | 11/2007 | Jha et al. | |
| 2008/0005683 A1* | 1/2008 | Aoki | G06F 16/958 715/763 |
| 2008/0037877 A1 | 2/2008 | Jia et al. | |
| 2008/0052140 A1* | 2/2008 | Neal | G06Q 30/02 705/1.1 |
| 2008/0059312 A1* | 3/2008 | Gern | G06Q 30/02 705/14.72 |
| 2008/0086686 A1 | 4/2008 | Jing et al. | |
| 2008/0117448 A1* | 5/2008 | Ijams | G06F 17/248 358/1.15 |
| 2008/0184287 A1* | 7/2008 | Lipscomb | G06Q 30/02 725/32 |
| 2008/0249855 A1* | 10/2008 | Collins | G06Q 30/00 705/14.54 |
| 2009/0055725 A1* | 2/2009 | Portnov | G06F 16/986 715/234 |
| 2009/0187477 A1* | 7/2009 | Bardin | G06Q 30/0273 705/14.69 |
| 2009/0265243 A1* | 10/2009 | Karassner | G06Q 30/02 705/14.54 |
| 2010/0083129 A1* | 4/2010 | Mishra | G06F 8/38 715/744 |
| 2010/0100442 A1* | 4/2010 | Gorsline | G06Q 30/02 705/14.53 |
| 2010/0211621 A1* | 8/2010 | Hariharan | G06Q 30/02 707/829 |
| 2010/0268609 A1 | 10/2010 | Nolet et al. | |
| 2010/0324997 A1* | 12/2010 | Evans | G06Q 30/02 705/14.69 |
| 2011/0015988 A1 | 1/2011 | Wright et al. | |
| 2011/0016408 A1* | 1/2011 | Grosz | G06K 9/6267 715/745 |
| 2011/0055025 A1* | 3/2011 | Krol | G06Q 30/00 705/14.73 |
| 2011/0202424 A1* | 8/2011 | Chun | G06F 3/0481 705/26.8 |
| 2011/0321003 A1* | 12/2011 | Doig | G06F 8/34 717/107 |
| 2012/0011003 A1* | 1/2012 | Ketchum | G06Q 30/0276 705/14.72 |
| 2012/0030014 A1* | 2/2012 | Brunsman | G06Q 30/0251 705/14.49 |
| 2012/0054130 A1 | 3/2012 | Mensink et al. | |
| 2012/0072272 A1 | 3/2012 | Kilar et al. | |
| 2012/0072286 A1 | 3/2012 | Kilar et al. | |
| 2012/0078961 A1* | 3/2012 | Goenka | G06F 16/972 707/778 |
| 2012/0191548 A1* | 7/2012 | Des Jardins | G06Q 30/0241 705/14.68 |
| 2012/0291057 A1 | 11/2012 | Gunda et al. | |
| 2013/0013425 A1 | 1/2013 | Spehr et al. | |
| 2013/0103692 A1 | 4/2013 | Raza et al. | |
| 2013/0117107 A1 | 5/2013 | Evans | |
| 2013/0132311 A1 | 5/2013 | Liu et al. | |
| 2013/0198636 A1* | 8/2013 | Kief | G06F 17/2241 715/730 |
| 2013/0204825 A1 | 8/2013 | Su | |
| 2013/0251248 A1 | 9/2013 | Guo et al. | |
| 2013/0339155 A1* | 12/2013 | Yerli | G06Q 30/0241 705/14.66 |
| 2014/0108145 A1 | 4/2014 | Patel et al. | |
| 2014/0114746 A1 | 4/2014 | Pani et al. | |
| 2014/0129490 A1 | 5/2014 | Wu et al. | |
| 2014/0136935 A1* | 5/2014 | Santillie | G06F 17/248 715/204 |
| 2014/0156416 A1* | 6/2014 | Goenka | G06Q 30/0276 705/14.66 |
| 2014/0207585 A1* | 7/2014 | Walke | G06Q 50/01 705/14.73 |
| 2014/0214529 A1* | 7/2014 | Gross-Baser | G06Q 30/0276 705/14.45 |
| 2014/0214790 A1 | 7/2014 | Vaish et al. | |
| 2014/0237331 A1* | 8/2014 | Brooks | G06Q 10/00 715/202 |
| 2014/0278959 A1* | 9/2014 | Nukala | G06Q 30/0243 705/14.49 |
| 2014/0279016 A1* | 9/2014 | Capel | G06Q 30/0261 705/14.58 |
| 2014/0281928 A1* | 9/2014 | Tkach | G06F 8/38 715/243 |
| 2014/0282076 A1* | 9/2014 | Fischer | G06F 3/0484 715/751 |
| 2014/0324604 A1* | 10/2014 | Munoz Torres | G06Q 30/0276 705/14.72 |
| 2015/0073922 A1* | 3/2015 | Epperson | G06Q 30/0277 705/14.73 |
| 2015/0106178 A1 | 4/2015 | Atazky et al. | |
| 2015/0154503 A1 | 6/2015 | Goswami et al. | |
| 2015/0206171 A1 | 7/2015 | Zigoris et al. | |
| 2015/0213514 A1* | 7/2015 | Doig | G06F 8/34 705/14.72 |
| 2015/0234542 A1* | 8/2015 | Kirillov | G06F 3/0481 715/800 |
| 2015/0248423 A1* | 9/2015 | Christolini | G06F 16/958 715/202 |
| 2015/0248484 A1* | 9/2015 | Yu | G06Q 30/02 707/711 |
| 2015/0332313 A1 | 11/2015 | Slotwiner et al. | |
| 2015/0379557 A1* | 12/2015 | Liu | G06Q 30/0244 705/14.43 |
| 2016/0019243 A1* | 1/2016 | Kamel | G06Q 30/0241 707/737 |
| 2016/0042409 A1* | 2/2016 | Gyllenberg | G06Q 30/0276 705/14.72 |
| 2016/0092405 A1* | 3/2016 | Lee | G06F 17/212 715/202 |
| 2016/0092935 A1* | 3/2016 | Bradley | G06Q 30/0276 705/14.72 |
| 2016/0147758 A1 | 5/2016 | Chhaya et al. | |
| 2016/0212500 A1* | 7/2016 | Makhlouf | H04N 21/222 |
| 2016/0307228 A1* | 10/2016 | Balasubramanian | G06F 9/542 |
| 2016/0307229 A1* | 10/2016 | Balasubramanian | G06F 9/542 |
| 2016/0307237 A1* | 10/2016 | Glover | G06Q 30/0275 |
| 2016/0328789 A1* | 11/2016 | Grosz | G06F 3/1242 |
| 2016/0334240 A1* | 11/2016 | Arokiaraj | G01C 21/367 |
| 2016/0345076 A1* | 11/2016 | Makhlouf | H04N 21/812 |
| 2016/0357717 A1* | 12/2016 | Metz | G06F 17/212 |
| 2016/0357725 A1* | 12/2016 | Homans | G06F 17/212 |
| 2016/0364770 A1* | 12/2016 | Denton | G06Q 30/0277 |
| 2016/0371230 A1* | 12/2016 | Kirillov | H04L 47/806 |

(56) References Cited

U.S. PATENT DOCUMENTS

| | | | |
|---|---|---|---|
| 2016/0371231 A1* | 12/2016 | Kirillov | ............... H04L 47/806 |
| 2017/0068996 A1 | 3/2017 | Qin | |
| 2017/0161794 A1* | 6/2017 | Zhu | ................. G06Q 30/02 |
| 2017/0178187 A1* | 6/2017 | Santi | ............... G06Q 30/0256 |
| 2017/0220694 A1 | 8/2017 | Vaish et al. | |
| 2017/0270083 A1* | 9/2017 | Pruitt | ................. G06F 17/2247 |
| 2018/0025470 A1* | 1/2018 | Wang | ................. G06T 3/40 |
| | | | 345/667 |
| 2018/0040029 A1 | 2/2018 | Zeng et al. | |
| 2018/0060921 A1* | 3/2018 | Mengle | ............... G06Q 30/0276 |
| 2018/0158094 A1* | 6/2018 | Chitilian | ................. G06F 9/542 |
| 2018/0189074 A1* | 7/2018 | Kulkarni | ............... G06Q 30/02 |
| 2018/0189822 A1* | 7/2018 | Kulkarni | ............... G06Q 30/0244 |
| 2018/0189843 A1* | 7/2018 | Kulkarni | ............... G06Q 30/0276 |
| 2018/0300745 A1 | 10/2018 | Aubespin et al. | |
| 2018/0365707 A1 | 12/2018 | Jha et al. | |

FOREIGN PATENT DOCUMENTS

| | | |
|---|---|---|
| WO | WO 2005-125201 A1 | 12/2005 |
| WO | WO 2011-009101 A1 | 1/2011 |

OTHER PUBLICATIONS

Schrier, E. et al., "Adaptive Layout for Dynamically Aggregated Documents," *IUI '08*, Jan. 13-16, 2008, Maspalomas, Gran Canaria, fourteen pages.

United States Office Action, U.S. Appl. No. 15/397,556, dated Jan. 24, 2019, 18 pages.

United States Office Action, U.S. Appl. No. 15/397,556, dated Aug. 13, 2018, 21 pages.

United States Office Action, U.S. Appl. No. 15/199,386, dated Apr. 29, 2019, 17 pages.

United States Office Action, U.S. Appl. No. 15/199,386, dated Dec. 31, 2018, 24 pages.

United States Office Action, U.S. Appl. No. 15/199,386, dated Aug. 15, 2018, 18 pages.

United States Office Action, U.S. Appl. No. 15/397,537, dated Apr. 17, 2019, 14 pages.

United States Office Action, U.S. Appl. No. 15/199,386, dated Aug. 6, 2019, 21 pages.

United States Office Action, U.S. Appl. No. 15/199,386, dated Dec. 2, 2019, 22 pages.

United States Office Action, U.S. Appl. No. 15/397,556, dated Dec. 6, 2019, 24 pages.

\* cited by examiner

PREVIEW OF CONTENT ITEMS FOR DYNAMIC CREATIVE OPTIMIZATION

BACKGROUND

This disclosure generally relates to online content distribution, and more specifically to providing a preview of a content item composed of individual components to a content provider.

Content providers produce content that is targeted to certain audiences within online systems. Users interact with content received from the online system. With the advent of online systems such as social networking systems, content providers have increasingly relied on the online systems to create effective sponsored content within the online system to greatly increase engagement among users of the online systems. For example, subsequent to presenting sponsored content provided by a content provider to users of an online system, the online system tracks how often the users interact with the presented content and calculates statistics for the content. These statistics may be accrued over numerous content campaigns and serve to measure the effectiveness of each content item in the campaign. Based on these statistics, the content provider can edit content items that perform poorly or alternatively choose to show content items that have performed very effectively.

Currently, content providers face challenges in running content campaigns at scale on an online system such as setting up content campaigns such that the best possible content item is created and delivered to each user of the online system. For example, current solutions only enable a content provider to present pre-assembled content items to users of an online system. Online systems can track the performance of pre-assembled content items but provide zero or very little feedback to content providers about the performance of particular components (e.g., text, images and videos) of a content item. Content providers cannot "see inside a content item" to understand which components of the content item did not perform well for their objectives or target audience.

SUMMARY

An online system, such as a social networking system, presents dynamically optimized content to users of the online system. Each sponsored content (also referred to as "content" or "content item"), has a number of different types of component creatives (also referred to as "creatives"). Examples of different types of creatives include images, videos, bodies of text, call_to_action_types (e.g. install application, play application), titles, descriptions, universal resource locators (URL), and captions.

The online system receives a number of component creatives from a content provider and employs a preview module to display the received component creatives as a pseudo-assembled content item. The pseudo-assembled content item is provided on a display interface to the content provider to visually preview how different assembled content items would appear to a user of the online system. A pseudo-assembled content item includes one or more creatives to be included in a sponsored content item that are placed in their positions in the display interface, but the content item has not yet undergone assembly or creation. The content provider can interact with the display interface to swap different creatives into the content item. Therefore, the preview module enables the content provider to preview different pseudo-assembled content items composed of different permutations of the received creatives.

By previewing different content items, a content provider can specifically choose certain combinations of creatives to be used as a sponsored content item to be presented to a user of the online system. Alternatively, a user of the dynamic creative optimization (DCO) system can narrow the set of all received creatives to a set of candidate creatives that are to be further analyzed in generating the sponsored content item. From the set of candidate creatives, the online system identifies an optimal creative for each type of creative. For example, the optimal image creative is selected from multiple image candidate creatives. The DCO module assembles the selected creatives into a content item. Each user of the online system is presented with a sponsored content item composed of the optimal creatives of each creative type, which are dynamically selected based on the user's information and information describing the component creatives. Different users of the online system are provided with different sponsored content composed of different component creatives, each component creative optimally selected for that audience or that user.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
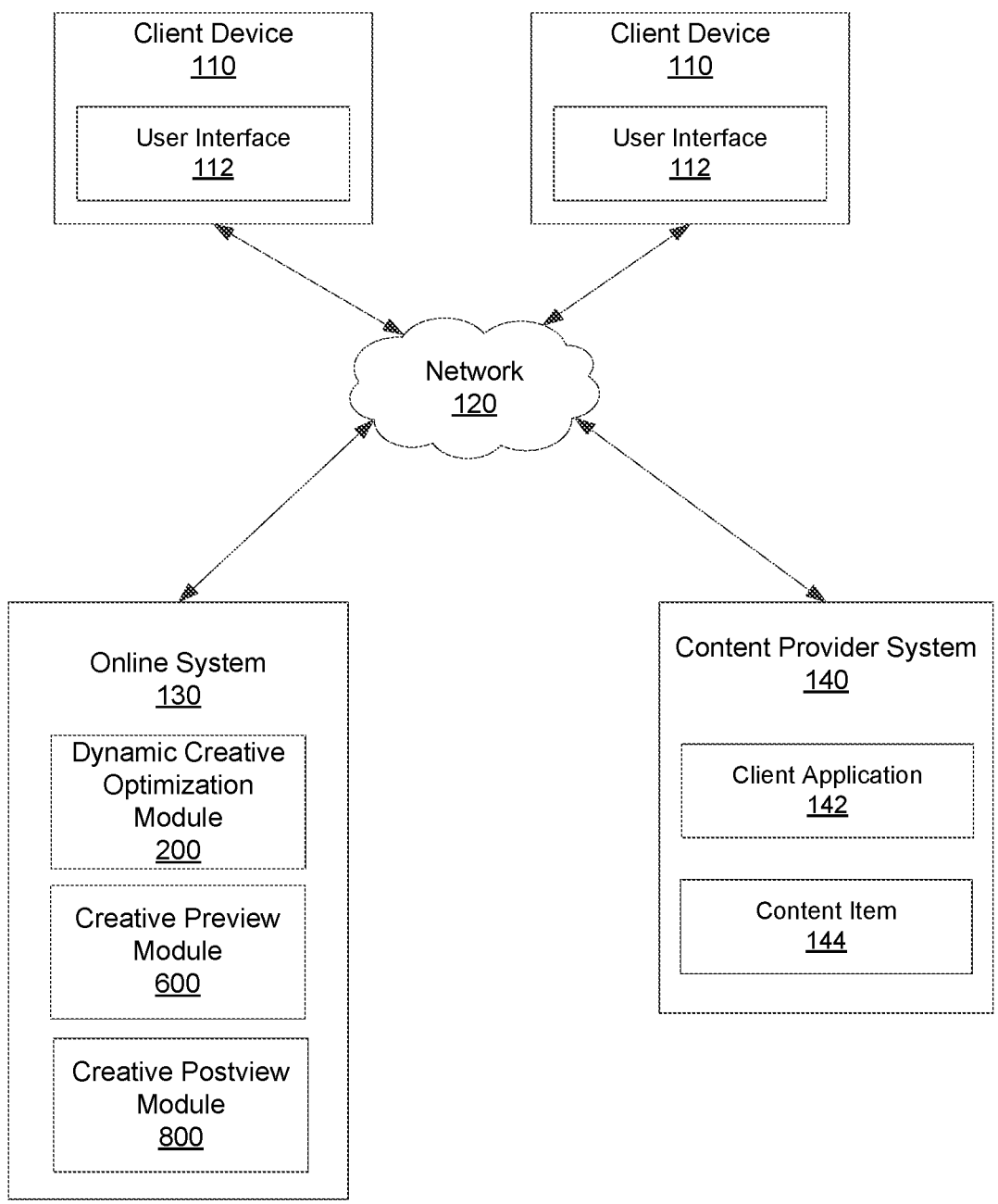
FIG. 1 is a system environment of an online system including a dynamic creative optimization module in operation with an asset rule engine according to one embodiment.

FIG. 1 is an illustration of one embodiment of a system environment 100 including a dynamic creative optimization (DCO) module 200 for dynamically creating content items from a set of individual component creatives for a target audience based on a set of rules associated with the component creatives, for previewing pseudo-assembled content items in a preview interface, and for postviewing dynamically generated content items in a postview interface. As shown in FIG. 1, the system environment 100 includes one or more client devices 110, a content provider system 140, and an online system 130 connected through a network 120. While FIG. 1 shows two client devices 110 for simplicity, each with a user interface 112 that a user can provide input to one online system 130, and one content provider system 140, it should be appreciated that any number of these entities may be included. In alternative configurations, different and/or additional entities may also be included in the system environment 100.

A client device 110 is a computing device capable of receiving user input through a user interface 112, as well as transmitting and/or receiving data via the network 120. Examples of client devices 110 include desktop computers, laptop computers, tablet computers (pads), mobile phones, personal digital assistants (PDAs), gaming devices, or any other electronic device including computing functionality and data communication capabilities. A user of the client device 110 accesses the online system 130 and interacts with content provided by the online system 130 or by the content provider system 140. For example, the user may retrieve the content for viewing and indicate an affinity towards the content by posting comments about the content or recommending the content to other users. Alternatively a user may indicate a dislike towards the content by flagging the content or closing or hiding the content window, thereby indicating that the user is not interested in the content.

The network 120 facilitates communications among one or more client devices 110, the online system 130, and/or one or more content provider systems 140. The network 120 may be any wired or wireless local area network (LAN) and/or wide area network (WAN), such as an intranet, an extranet, or the Internet. In various embodiments, the network 120 uses standard communication technologies and/or protocols. Examples of technologies used by the network 120 include Ethernet, 802.11, 3G, 4G, 802.16, or any other suitable communication technology. The network 120 may use wireless, wired, or a combination of wireless and wired communication technologies. Examples of protocols used by the network 120 include transmission control protocol/Internet protocol (TCP/IP), hypertext transport protocol (HTTP), simple mail transfer protocol (SMTP), file transfer protocol (TCP), or any other suitable communication protocol.

The content provider system 140 is used by content providers for interacting with the online system 130. Examples of interactions include providing content, providing components of the content such as different types of creatives to be included in the content, and providing information related to the content and the components such as rules defining one or more actions that can be performed on each of the components and under what condition. In the embodiment shown in FIG. 1, the content provider system 140 has a client application 142 and a content item 144. The content provider system 140 interacts with the online system 130 using application programming interfaces (APIs) of the online system 130. The client application 142 allows users associated with content provider system 140 to interact with the online system 130. The client application 142 may present a user interface that is different from the user interface of the client device 110.

The content provider system 140 provides one or more content items 144 and/or component creatives to be included in a content item 144 to the online system 130. A content item 144 may be sponsored content such as advertisements sponsored by advertisers. A content item 144 is a combination of a number of component creatives (also called "creatives"); each component creative is a part of the content item 144 to be presented to a target user and each component creative is of a type. Examples of types of creatives includes image, video, body representing the primary message of the content item, call_to_action_type (e.g., shop_now, learn_more, etc.,), title representing a short headline in the content item, description representing secondary message of the content item, URL, and caption representing corresponding text of an URL. In one embodiment, a content provider system 140 provides a content item 144 having a set of predetermined creatives to the online system 130 for presentation to a target user, e.g., {Image A, Title A, Body B}. In another embodiment, a content provider system 140 provides a set of creatives to the online system 130, which dynamically decides which creative to use in the content item 144 to be delivered to a target user. For example, a content provider system 140 is able to provide a content item 144 in a set having the following different types of creatives:

```
{
    Images: {ImageA, ImageB, ImageC}
    Titles: {TitleA, TitleB, TitleC}
    Body: {BodyA, BodyB, BodyC}
}
```

The online system 130 communicates via the network 120 with the content provider system 140, and/or with one or more client devices 110. In one embodiment, the online system 130 comprises a dynamic creative optimization module 200, a creative preview module 600, and a creative postview module 800. The online system 130 receives a content item 144 having a set of predetermined creatives. In another embodiment, the online system 130 receives a set of creatives from which the content item 144 is dynamically created according to a set of rules associated with the creatives upon receiving a request for presentation of a content item 144. The online system 130 then delivers the content item 144 to its target audience. For simplicity, the content item 144 having a set of predetermined creatives is referred to as "pre-assembled content item" and the content item 144 to be dynamically assembled is referred to as "DCO content item."

In various embodiments, the online system 130 receives the set of creatives from the content provider system 140 and a set of rules associated with the set of creatives, and provides a display interface for previewing pseudo-assembled content items. Here, a content is referred to as "pseudo-assembled" because the creatives to be included in the content item are placed in their positions in the display interface displaying the content item, but the content item has not yet undergone assembly or creation. The positions of the creatives are defined by one or more placement rules provided by the content provider system 140. The online system 130 may present this preview on a graphical user interface (GUI) provided by a creative preview module 600. Therefore, placement rules may consider historical trends of where users tend to interact with creatives on the GUI. Additionally, the GUI displayed by the creative preview module 600 may be further configured to receive a user input (e.g. a forward and backward buttons to display alternative creatives in the pseudo-assembled content within the GUI display). Responsive to receiving the user input, the creative preview module 600 may switch out a first creative in the pseudo-assembled content item with a different creative. Thus, a user of the GUI can visually preview different content item candidates assembled from different permutations of creatives from the set of creatives of the content item.

To generate a DCO content item, the online system 130 applies one or more rules associated with the creatives of the DCO content item, the one or more rules specifying conditions under which to generate the DCO content item. The online system 130 identifies a set of candidate creatives to be included in the DCO content item, that satisfy the one or more rules. For each candidate creative, the online system 130 applies a trained machine learning model, each machine learning model associated with a creative type in the content item 144, e.g., an image model being applied for image creatives in the content item 144. Each candidate creative is applied by its corresponding trained component model to generate a prediction score that also takes into consideration the target user's information. The candidate creatives are ranked based on their respective prediction scores.

In various embodiments, the online system 130 displays a content item generated from the ranked candidate creatives through a creative postview module 800. The creative postview module 800 may present the content item through a GUI and allows a user (e.g. content provider) to view the content item that is composed of candidate creatives that satisfy the rules specified by the content provider system 140. The user can choose to provide an input (e.g. a click) to view different content items that are each composed of different combinations of candidate creatives. Additionally, the creative postview module 800 may also present statistical information regarding the content item such as the statistics of advertisement campaigns involving the content item (e.g. click through rate). A user of the GUI provided by the creative postview module 800 may select a particular combination of candidate creatives to generate an assembled DCO content item for presentation to the target user or different target audiences based on the statistics of the content item. In various embodiments, the online system 130 receives the selected combination of creatives indicated by the user of the GUI provided by the creative postview module 800 and assembles the DCO content item from the selected combination of creatives.

In other embodiments, the online system 130 assembles the DCO content item for a target user without input from a user of the GUI. For example, the online system 130 generates the DCO content item using the highest ranked creatives of each type. Therefore, two different target users may be provided with different DCO content items composed of different combinations of creatives. Using the example described above, the online system 130 dynamically decides which creatives to use in the DCO content item to be delivered to a target user. For example, for user 1, the content item 144 includes {ImageB, TextB and BodyB }; for a different user, e.g., for user 2, the content item 144 includes {ImageC, TextA, BodyC}. Dynamically assembling content item is further described with reference to FIG. 2.

The online system 130 additionally permits users to establish connections (e.g., friendship type relationships, follower type relationships, etc.) between one another. In one embodiment, the online system 130 stores user accounts and/or user profiles describing the users of the online system 130. User profiles are associated with the user accounts and include information describing the users, such as demographic data (e.g., gender information), biographic data (e.g., interest information), etc. Using information in the user profiles, connections between users, and any other suitable information, the online system 130 maintains a social graph of nodes interconnected by edges. Each node in the social graph represents an object associated with the online system 130 that may act on and/or be acted upon by another object associated with the online system 130. An edge between two nodes in the social graph represents a particular kind of connection between the two nodes. An edge may indicate that a particular user of the online system 130 has shown interest in a particular subject matter associated with a sponsored content. For example, the user profile may be associated with edges that define a user's prior activity that includes, but is not limited to, visits to various web pages, searches for web pages, commenting and sharing web pages, liking content items, commenting on content items, sharing content items, joining groups, attending events, checking-in to locations, and buying products advertised by advertisements presented to the user.

In one embodiment, the online system 130 may use edges to generate stories describing actions performed by users, which are communicated to one or more additional users connected to the users through the online system 130. For example, the online system 130 may present a story to an additional user about a first user (e.g. a friend) that has liked a new game or application advertised by a sponsored content item presented to the first user. The additional user may choose to interact with the presented story thereby creating an edge in the social graph maintained by the online system 130 between the additional user and the subject matter of the story. The online system 130 may store this edge. This edge may be retrieved at a future time point when the online system 130 seeks to identify components that may align well with the additional user's preferences.

In various embodiments, in addition to receiving creatives from the content provider system 140, the online system 130 may also receive one or more requests for content, e.g., sponsored advertisements. In various embodiments, an advertisement request includes a landing page specifying a network address to which a target user is directed when the advertisement is accessed. An advertisement request from an advertiser also includes a bid amount associated with an advertisement. The bid amount is used to determine an expected value, such as monetary compensation, provided by an advertiser to the online system 130 if the advertisement is presented to a target user, if the advertisement receives a user interaction, or based on any other suitable condition. For example, the bid amount specifies a monetary amount that the online system 130 receives from the advertiser if the advertisement is displayed and the expected value is determined by multiplying the bid amount by a probability of the advertisement being accessed.

Dynamic Creative Optimization (DCO) with an Asset Rule Engine

Figure 2:
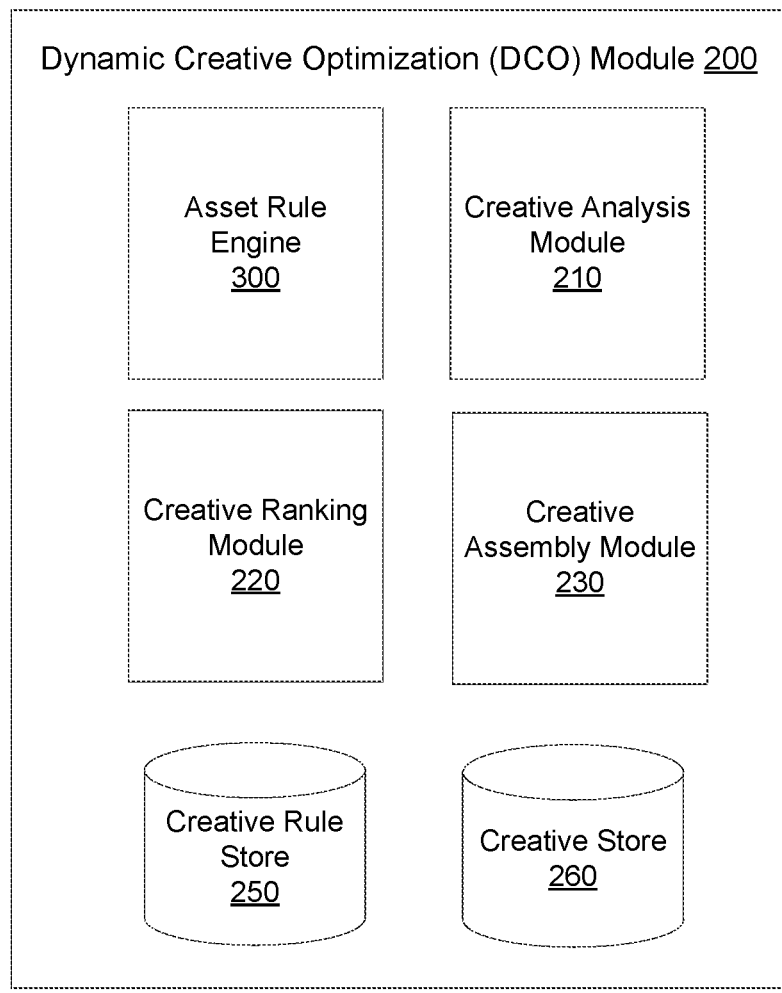
FIG. 2 is a block diagram of a dynamic creative optimization module having an asset rule engine according to one embodiment.

In one embodiment, the online system 130 has a dynamic creative optimization module 200 to dynamically select creatives to be included in a content item for a target user according to a set of rules associated with the creatives. FIG. 2 is a block diagram of the DCO module 200 shown in FIG. 1 in accordance with an embodiment of the invention. In the embodiment shown in FIG. 2, the DCO module 200 includes an asset rule engine 300, a creative analysis module 210, a creative ranking module 220, a creative assembly module 230, and a creative rule store 250. In alternative configurations, less, different and/or additional entities may also be included in the DCO module 200, e.g., a feature store for storing features describing individual creatives and features describing users of the online system 130.

The DCO module 200 receives a set of creatives from a content provider such as an advertiser, each creative having a creative type. Additionally, the DCO module 200 receives rules from a content provider through a creative feed, the rules describing a variety of conditions or constraints on when and how to select and combine the creatives into content items. The DCO module 200 dynamically creates a content item for a user (or for a target audience that includes the user). The dynamically created content item includes the optimal combination of creatives for the user, the optimal combination of creatives selected in accordance with the received rules. If the DCO module 200 is presented to a different audience for the same set of creatives, it may create a different content item composed of a different set of optimal creatives selected for that different audience.

In various embodiments, the DCO module 200 includes an asset rule engine 300, which applies the rules associated with the set of creatives to narrow down the received set of creatives to a set of candidate creatives. For example, the target user may be identified to be a 25 year old male individual. A rule may specify that a subset of creatives are only to be presented to individuals who are 40 years old or older. Therefore, the subset of creatives targeting the audiences who are 40 years old or older are eliminated from consideration for this target user. The remaining creatives following application of the rules are deemed candidate creatives.

The DCO module 200 trains a machine learning model for each type of creative and provides, as input into the machine learning model creative model, the candidate creative and information regarding the target user (or target audience that includes the audience). The DCO module 200 generates a prediction score for each candidate creative and selects a set of optimal creatives to be assembled into a content item for the target user.

Asset Rule Engine for DCO

Figure 3:
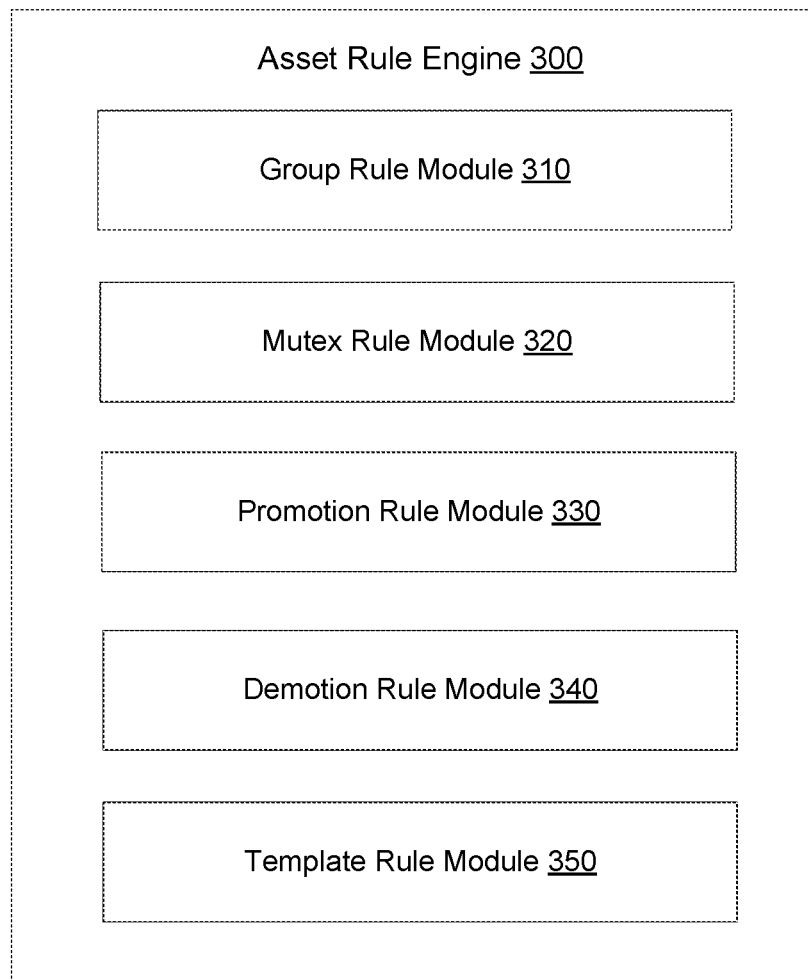
FIG. 3 is block diagram of an asset rule engine according to one embodiment.

The asset rule engine 300 is further depicted in FIG. 3. In various embodiments, the asset rule engine 300 includes individual modules to handle each of the different types of rules that are received. As shown in FIG. 3, the asset rule engine 300 includes the group rule module 310, the mutex rule module 320, the promotion rule module 330, the demotion rule module 340, and the template rule module 350. Further reference will be made hereafter to FIG. 4A-4J that each depicts an example of a DCO content item generated according to the corresponding rules.

The asset rule engine 300 applies the rules received from the content provider system 140 to corresponding creatives during content item generation. The rules describe actions and conditions applied to creatives to be included in a DCO content. In one embodiment, the asset rule engine 300 receives the rules through the creative feed from the content provider and stores the received rules in the creative rule store 250. The asset rule engine 300 retrieves characteristics from a user profile of the target user and applies the characteristics in combination with the received rules. Characteristics of the target user include the target user's age, gender, ethnicity, and other information. For example, a rule may specify that a creative is selected for male individuals. Creatives that do not satisfy the rules are removed from consideration for the target user. The remaining creatives are designated as candidate creatives and further analyzed for inclusion in the DCO content item.

In one embodiment, each rule for creating a DCO content item includes a condition, and a type of action to be performed on one or more creatives. The condition defines when the action defined by the type of action should be applied to one or more creatives. Examples of conditions include: Boolean, string, int (representing an integer value); examples of operators associated with actions include: not equal, equal, bigger than, smaller than, logic "AND" and logic "OR." For example, a condition specifying individuals below the age of 21 may be represented by the following pseudo-code: [$AGE, '<', 21]

Example pseudo-code of a creative rule in the creative feed is as follows:

```
AssetRule : [
    Condition,
    CreativeActionType,
    CreativeAction
]
```

The asset rule engine 300 parses the rules in the creative feed based on the CreativeActionType (e.g. group, mutex, promotion, demotion, template) and assigns the rule to the appropriate rule action module, e.g., group rule module 310, mutex rule module 320, etc.

The group rule module 310 applies group rules to multiple creatives that are specified in the creative feed. Group rules specify creatives that are presented together in a DCO content item. For example, an image creative is displayed together with a particular body text creative. Referring to the content item shown in FIG. 4A, an image creative 405 depicts a female individual surrounded by the sun. A group rule may specify that a particular body text creative needs to be presented with the image creative 405. In this case, an appropriate body text creative 410 recites "start warm from the inside out" and effectively describes the image creative 405. Therefore, the group rule ensures that individual creatives are not paired with other creatives that would yield a nonsensical content item. Group rules may specify more than two creatives that are presented together in one content item.

Example pseudo-code of a group rule received in the creative feed is as follows:

```
// Under all conditions, always group image 405 and body 410 together.
[
    True,              // Condition: under all conditions
    'Group',           // CreativeActionType
    [                  // CreativeAction: Group
        ['image', 405],
        ['body', 410],
    ],
]
```

The mutex rule module 320 applies mutex rules to multiple creatives that are specified in the creative feed. Mutex rules specify two or more creatives that are not to be presented in the same content item. For example, referring to FIG. 4B, an image creative 420 displaying an alcoholic beverage would be deemed nonsensical or inappropriate if it were grouped with a body text creative 425 that recited "Great for kids!!" Therefore, the mutex rule in the creative feed may specify that these two creatives are not to be included in the same content item.

Example pseudo-code of a mutex rule received in the creative feed is as follows:

```
// Under all conditions, never group image 420 and body 425 together.
[
    True,              // Condition: under all conditions
    'Mutex',           // CreativeActionType
    [                  // CreativeAction: Mutex
        ['image', 420],
        ['body', 425],
    ],
]
```

Figure 4A:
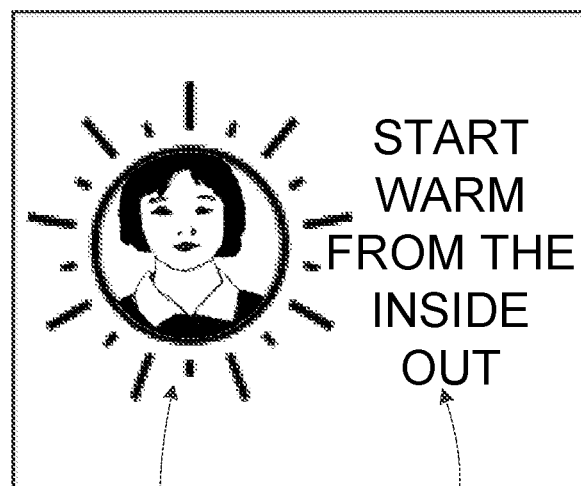
FIG. 4A-4J depict example content items assembled using dynamic creative optimization according to rules associated with individual creatives according to one embodiment.
Figure 4B:
Figures 4C, 4D:
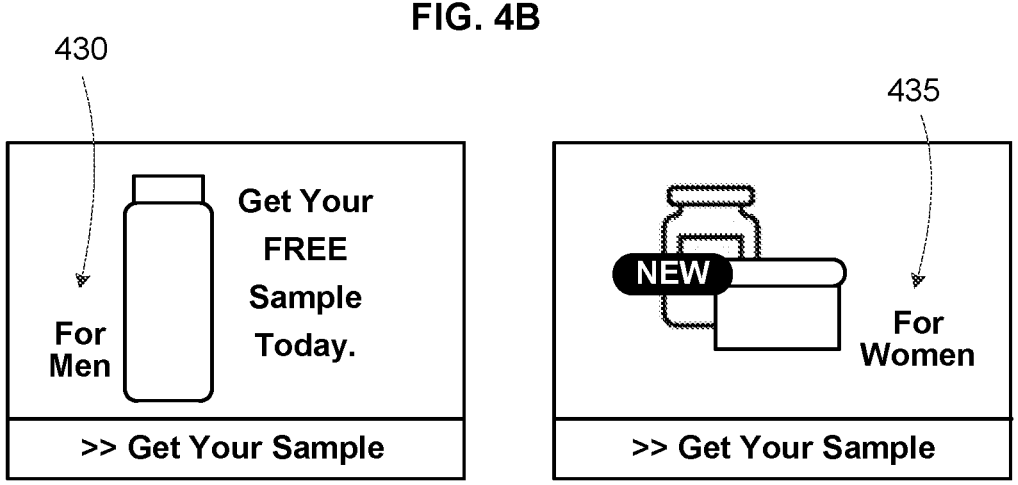

The promotion rule module 330 applies promotion rules to one or more creatives that are specified in the creative feed. For example, promotion rules define which creative is to be automatically selected for a creative type based on a particular condition. For example, FIG. 4C is a DCO content item for presentation to a male individual. FIG. 4D is a DCO content item for presentation to a female individual. In generating these DCO content items, the promotion rule in the creative feed may specify that the text "For Men" is automatically selected as the description text creative 430 if the target user is identified to be male. However, if the target user is identified to be a female, then the text "For Women" is automatically selected as the description text creative 435 in the content item.

Example pseudo-code of a promotion rule received in the creative feed is as follows:

```
// If $GENDER = 'Male', always show description text 430
[
    [$GENDER, '==', 'Male'],      // Condition: if the target user is male
    'Promotion',                   // CreativeActionType
    [                              // CreativeAction: Promotion
        ['description': 430],
    ],
]
```

Figure 4E:
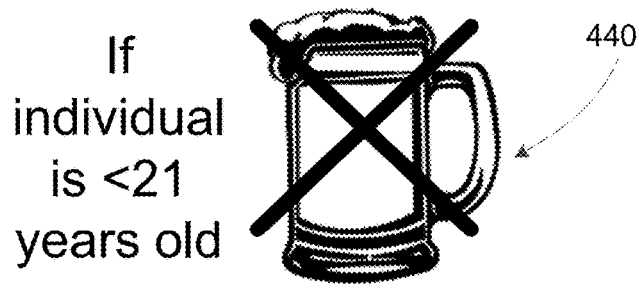

The demotion rule module 340 applies demotion rules to one or more creatives that are specified in the creative feed. For example, demotion rules specify that a particular creative is not to be selected under a particular condition. Referring to FIG. 4E, a demotion rule may specify that an image creative 440 depicting an alcoholic beverage is not to be selected if the target user is identified to be below the age threshold of 21 years old.

Example pseudo-code of a demotion rule received in the creative feed is as follows:

```
// If $AGE < 21, never show image 440.
[
    [$AGE, '<', 21],         // Condition
    'Demotion',               // AssetActionType
    [                         // AssetAction
        'image': 440,
    ],
]
```

The template rule module 350 applies template rules to one or more creatives that are specified in the creative feed. For example, template rules may describe a variety of different customizations for a content item that is triggered upon satisfying the condition specified in the template rule. Customizations can include the language that textual creatives are expressed in or geographical locations expressed in certain creatives. For example, the template rule specifies that upon satisfying a condition, a first keyword (or first phrase) is to be replaced by a second keyword (or second phrase).

Figure 4F:
Figure 4G:
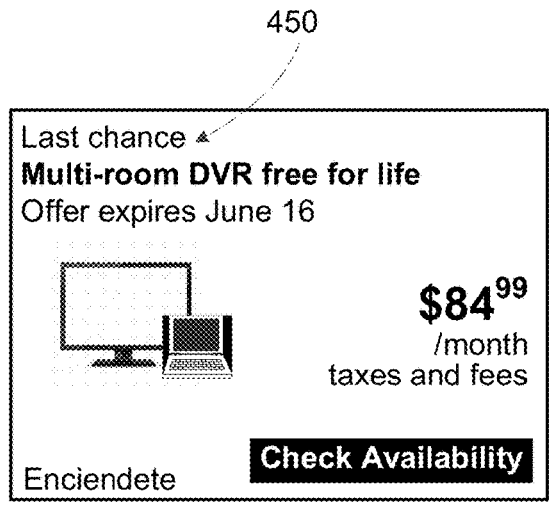

As a specific example, the content item in FIG. 4F may be created for a target user that lives in Spain and speaks the Spanish language. Therefore, the title creative 445, which recites "Last chance" 450 by default, is replaced by the second phrase of "Ultimate oportunidad," which is "Last chance" in Spanish. Additionally, other creatives (e.g. body text, description text) are also specified by the template rule to be delivered in the Spanish language. Alternatively, the template rule may specify that for a target user that speaks English and lives in the United States, the title creative 445 recites "Last chance" as shown in FIG. 4G.

Example pseudo-code for the template rule that specifies the title creative 445 and 450 is as follows:

```
// title 200 can be customized based on $LANGUAGE and $COUNTRY.
[
    [[$LANGUAGE, '==', 'SPANISH'], 'AND', [$COUNTRY, '==', 'ESP']],   // Condition
    'Template',                                                         // AssetActionType
    [                                                                   // AssetAction
        'title', 200,
        [
            [$TITLE, 'Ultima oportunidad'],
        ]
    ],
],
[
    [[$LANGUAGE, '==', 'EN_US'], 'AND', [$COUNTRY, '==', 'USA']],     // Condition
    'Template',                                                         // AssetActionType
    [                                                                   // AssetAction
        'title', 200,
        [
            [$TITLE, 'Last chance'],
        ]
    ],
].
```

Figure 4H:
Figure 4I:
Figure 4J:

In various embodiments, the template rules customize a content item based on geographical locations of its target audiences. Referring to FIG. 4H-4J, each content item displays airfare costs to a location specified in the body text creative. For example, the template rule may specify a geographical location that corresponds to a target user's birthplace. Thus, if a target user specifies in his/her user profile that their birthplace was in Hong Kong, then the content item may display "Hong Kong" 455 as the body text creative as well as associated airfare prices. In various embodiments, a target user's past travel itineraries may determine the location specified in the body text creative. For example, if a target user has traveled to San Francisco numerous times in the previous months, the template rule may specify that the body text creative display "San Francisco" 460. Other information associated with the target user may also be specified by the template rule in determining the geographical location to be displayed. For example, if the target user has young children, the template rule may specify that "Orlando" 465 be displayed as the body text creative given that numerous family friendly theme parks are located in Orlando.

In some embodiments, the template rule does not use a target user's information to specify a creative. For example, the template rule may specify a body text creative based on time. If a content item is to advertise a new television show that will premier in 2 weeks, then the template rule specifies that the body text creative display an exact date (e.g. January 20$^{th}$). However, if the new television show is to premier in less than a week, then the template rule specifies that the body text creative display a day of the week (e.g. next Wednesday).

Dynamic Creative Optimization for Generating a DCO Content Item

Returning back to FIG. 2, the creative analysis module 210 receives creatives of a content item through the network 120 from the content provider system 140. In various embodiments, the creative analysis module 210 extracts features of each creative and stores the extracted creative features in a creative feature vector. In one embodiment, the creative analysis module 210 extracts specific features associated with each type of creative. For example, for textual creatives such as description, call_to_action_type, and caption and body text, the creative analysis module 210 uses textual analysis methods known to those of ordinary skills in the art to extract individual words and text strings from the creatives. Taking the text in the title creative 410 of the content item as illustrated in FIG. 4A as an example, the creative analysis module 210 extracts the individual words included in the title text such as "warm" and "inside". Text strings composed of individual words may also be concatenated to produce additional extracted features (e.g. "warm inside", "inside out"). Further extracted features may include font size, font color, and number of words associated with a textual component of the creative.

The creative analysis module 210 extracts various image features associated with an image creative such as dominant color of the image, background color of the image, size of the image (e.g., width and length of the image), and a total number of image skin blobs. In one embodiment, the creative analysis module 210 uses image processing algorithms such as edge detection, Blob extraction, histogram analysis, pixel intensity filtering, gradient filtering, or scale-invariant feature transform to extract visual features of an image. Alternatively, the creative analysis module 210 applies an image feature extraction model to extract visual features of an image, where the extraction model is trained using asynchronous stochastic gradient descent procedure and a variety of distributed batch optimization procedure on computing clusters a large corpus of training images.

In addition to visual images associated with an image creative, the creative analysis module 210 may also extract other information associated with the image, e.g., textual caption of the image, and other related information, e.g., location of the feature in the image creative. For example, in FIG. 4A, the location of the female individual located within a sun may be stored as a feature. The creative analysis module 210 similarly extracts features of other types of components, e.g., videos, by applying suitable feature extraction schemes such as video processing for videos.

In some embodiments, the creative analysis module 210 uses machine learning models to analyze the extracted features of each creative. The creative analysis module 210 may continuously train a variety of machine learning models for each creative type using training data stored in the training data store (not shown). For example, the creative analysis module 210 trains an image model for image creatives, a video model for video creatives, a title model for title creatives, a body model for body creatives, a call_for_action_type model for call_for_action_type creatives, and a caption model for caption creatives. Each trained machine learning model is configured to generate a prediction score for each candidate creative to be included in a content item for a target user; in other words, each trained model takes target user information and creative information and generates a score that reflects how likely the target user will click on the content item that includes the creative. The target user information is represented by multiple user features (e.g., a few thousand features from the user profile and other information associated with the user) such as age, gender, demographic group, socioeconomic status, personal interests, and social connections. The creative information is represented by multiple creative features (e.g., a few hundred features from the creatives) such as image width, height, and image's most frequent pixel value for green component.

For example, a trained image model, ImageModel, is configured to predict how likely a user, User, is to click a content item having an image, ImageA, as follows: ImageModel (ImageA, User)→0.50, where 0.50 is the prediction score. Similarly, the trained image model can be applied to another image, ImageB, to predict how likely User is to click the content item having an ImageB as: ImageModel (ImageB, User)→0.55, where 0.55 is the prediction score.

In one embodiment, the creative analysis module 210 trains the creative models using one or more machine learning algorithms such as neural networks, naïve Bayes, and support vector machines with training data. The DCO module 200 may additionally include a training data store that stores various training data for the creative analysis module 210 to train the machine learning models. Examples of the training data include statistics of past advertisement campaigns, such as the click-through rate (CTR) or impression rate, of previously presented creatives or content items of assembled creatives. The training data store also stores training data describing user information of various types of target audiences, e.g., age, gender, demographic group, socioeconomic status.

In one embodiment, the different machine learning models are trained based on the user information. For example, responsive to training samples showing that the male, 18-25 year old group more preferably interacts with image creatives depicting sports cars as opposed to other types of cars, the creative analysis module 210 trains an image machine learning model that generates a higher prediction score for an image creative showing a sports car than for an image creative depicting a minivan for a male user of the same age group.

In one embodiment, the different machine learning models are trained for different target audiences based on user actions committed by the user of the online system 130. For example, a user may have numerous positive posts about victories by the Golden State Warriors on his/her user profile, and the online system 130 stores edges between the user and the Golden State Warriors. The creative analysis module 210 trains various creative models to generate higher prediction scores for creatives related to the Golden State Warriors. At run time, the online system 130 receives an image creative from the content provider system 140 that depicts an image of the Warriors logo. The creative analysis module 210 may extract an image feature that is related to the Warriors. The image creative of the Warriors logo receives a prediction score that is scored highly for the user by an image machine learning model.

The creative analysis module 210 retrieves the extracted features of the individual creatives of a content item and user features of a target user of the content item from a user feature store or the user profile and maps each feature to a feature value. In one embodiment, the creative analysis module 210 organizes the creative features and the user features as an array (also called "feature vector"). Each feature has an identification and a feature name, e.g., {Feature1: age}. An example feature vector for an image creative described by its width and height and a targeting audience defined by its age and gender is as follows:

```
{
    Feature1: age
    Feature2: gender
    Feature 3: image width
    Feature 4: image height
}
```

Although this example feature vector depicts 4 different features (2 from the user, 2 from the image creative), one skilled in the art can appreciate that in other examples, there may be thousands of additional features associated with the user and the image creative that may be included.

The creative analysis module 210 maps each feature in the feature vector associated with a content item to a feature value based on the target user information and creative information of the content item. Each feature value has a predefined value range. For example, gender can be represented by either 1 (for male) or 0 (for female). For a color image in RGB (red-green-blue) color space and each color pixel being represented by 8 bits, a feature representing the color image's more frequent pixel value for its red, green or blue component has a feature value between 1-255. Taking the feature vector of an image creative described by its width (640 pixels) and height (480 pixels) and a targeting audience defined by his age (29 years old) and gender (male represented by 1), the creative analysis module 210 transforms the feature vector into an array of feature values such as [29, 1, 640, 480].

Additional details regarding the analysis of creatives for a DCO content item are described in U.S. patent application Ser. No. 15/199,386, filed on Jun. 30, 2016, which is hereby incorporated by reference in its entirety.

The creative ranking module 220 generates a score for each creative and ranks each creative in the set of candidate creatives to be included in a content item. These creatives in the set of candidate creatives satisfy the rules specified in the creative feed in view of characteristics of a target user. In one embodiment, the creative ranking module 220 retrieves a trained machine learning model and applies the machine learning model to each creative candidate of the corresponding type. For example, the creative ranking module 220 applies a trained image creative model to each image creative candidate and generates a prediction score for the image creative candidate for a given target user. Similarly, the creative ranking module 220 applies a trained title creative model to each title creative candidate and generates a prediction score for the title creative candidate for a given target user. Additionally, the trained image creative model and the trained title creative model are trained for a population group that has at least one characteristic that match at least one characteristic of the target user (e.g. age, gender, demographic group, etc.). Using the prediction scores, the creative ranking module 220 ranks the creative candidates for each creative type and selects an optimal creative having the highest prediction score among all creative candidates of the same type. For example, assume that after applying the one or more rules specified in the creative feed, the online system 130 identifies two images, ImageA and ImageB, and three titles, TitleA, TitleB, and TitleC, as candidate creatives to be considered for inclusion in a content item for a target user, User. The creative ranking module 220 applies an image creative model, e.g., ImageModel, to each of the two images and generates a prediction score for each image. Similarly, the creative ranking module 220 applies a title creative model, e.g., TitleModel, to each of the three titles and generates a prediction score for each title. Based on the prediction scores, the creative ranking module 220 selects an image having the highest prediction score from the two image creative candidates and a title having the highest prediction score among the three title creative candidates. An example pseudocode for the operations of the creative ranking module 220 using the above example is as follows:

```
{
    ImageModel (ImageA, User) = 0.50;
    ImageModel (ImageB, User) = 0.55;   //ImageB will be selected for
                                          User.
    TitleModel (TitleA, User) = 0.30;
    TitleModel (TitleB, User) = 0.35;
    TitleModel (TitleC, User) = 0.40;   //TitleC will be selected for
                                          User.
}
```

In various embodiments, the creative ranking module 220 may store the ranked candidate creatives and their associated prediction scores in the creative store 260 for retrieval at a subsequent time. In other embodiments, the creative ranking module 220 provides the ranked candidate creatives to the creative postview module 800 so that the user of the content provider system 140 can preview different DCO content items that are composed of the ranked candidate creatives. Additionally, the creative ranking module 220 may identify the highest ranked creative of each creative type (e.g. ImageB, TitleC) as the optimal creative of each creative type and provide them to the creative assembly module 230.

The creative assembly module 230 retrieves the optimal creatives of each creative type, where each optimal creative has the highest prediction score among multiple creatives of the same creative type for a target user, and fully assembles the optimal creatives into a DCO content item to be shown to the target user. In some embodiments, a user of the creative postview module 800 manually selects the optimal creatives to be included in the content item and provides them to the creative assembly module 230. The creative assembly module 230 assembles a DCO content item composed of the optimal creatives that are selected for each different target user. The creative assembly module 230 provides the DCO content item for a target user to other modules (not shown) such as content bidding module of the online system 130 for further processing. In response to a request for content items for the target user, the content bidding module of the online system 130 evaluates all the content item candidates including the DCO content item for the target user based on a variety of evaluation factors (e.g., age of each content item, whether the content item has previously been shown) and selects the best content item for the target user at that particular moment.

In some embodiments, the creative assembly module 230 further calculates a creative score. The creative score is indicative of the anticipated effectiveness of the fully assembled DCO content item. In one embodiment, the creative score may simply be an average prediction score based on the prediction scores of the individual creatives included in the DCO content item. In some embodiments, the creative score of the DCO content item is a weighted average of the prediction score of the individual creatives in the DCO content item, where each creative's prediction score may be weighed differently depending on the type of the creative. In one embodiment, the weighting may be determined based on the population group that the DCO content item is targeted for. In some embodiments, the creative score of the DCO content item is calculated based on the past number of clicks on the DCO content item by its target user over a period of time.

Assembling Creatives Using DCO and Associated Rules

Figure 5:
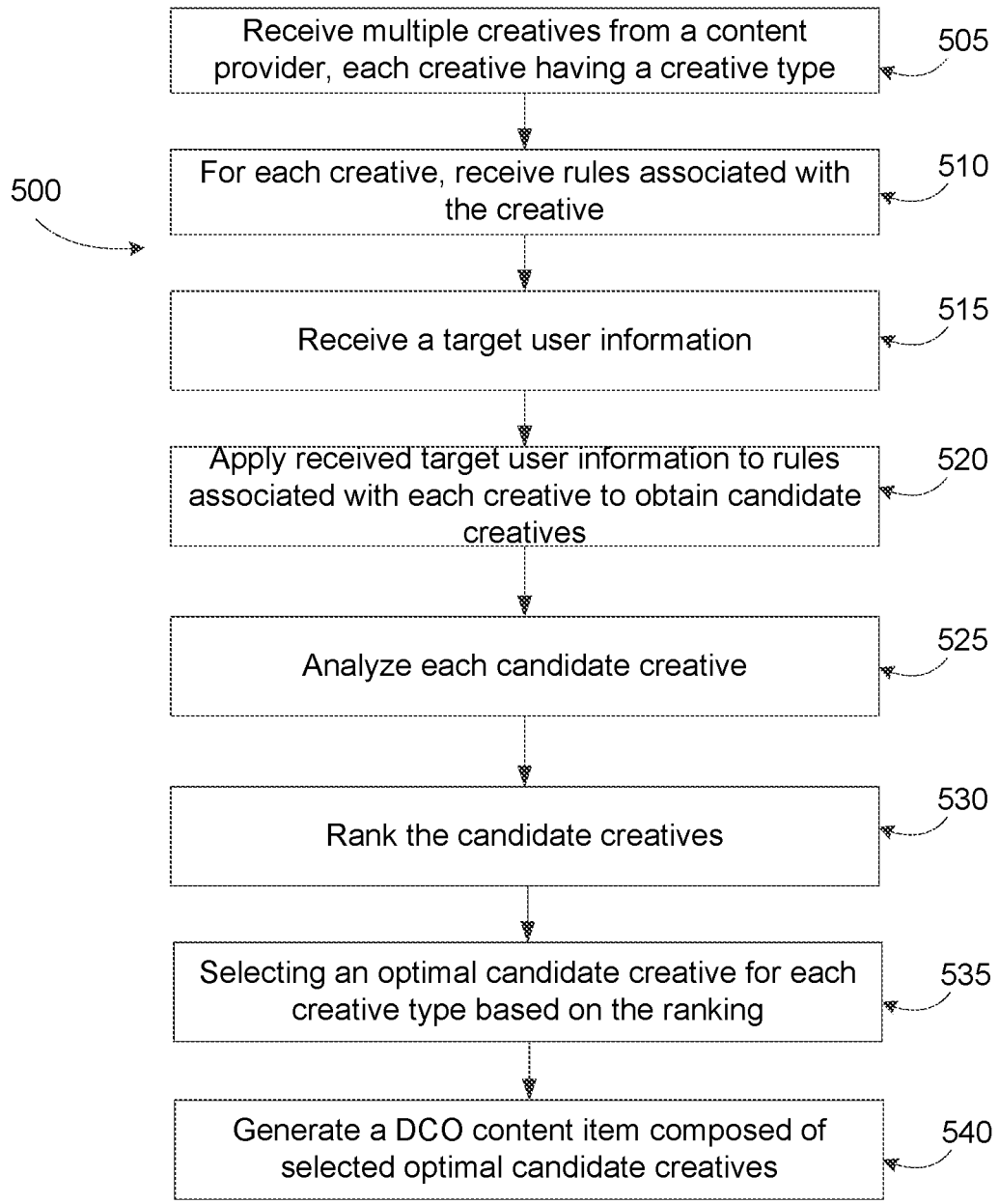
FIG. 5 depicts a flow diagram of generating a dynamic creative optimization content item using individual creatives and associated rules according to one embodiment.

FIG. 5 shows a flowchart of a process 500 for assembling a content item for a target user using dynamic creative optimization while considering rules provided by a content provider system 140, in accordance with one embodiment. Initially, the DCO module 200 receives 405 multiple creatives from a content provider system 140. Each of the received creatives also has a corresponding creative type (e.g. image creative, title creative, description text creative, etc.) Additionally, the asset rule engine 300 receives 510 rules from the content provider system 140 that specify how the creatives are to be assembled into a content item.

The DCO module 200 identifies and receives 515 information describing a target user. For example, information describing the target user may include the target user's age, gender, socioeconomic status, and demographic group. The asset rule engine 300 applies 520 the received rules in connection with the target user information to the creatives, where the creatives that violate the rules for the target user are removed from consideration. The set of creatives that satisfy the rules are selected as candidate creatives.

The DCO module 200 analyzes 525 each selected candidate creative based on the target user information to determine the best creatives for inclusion in a DCO content item. In various embodiments, the DCO module 200 extracts features of each candidate creative and features of the target user and applies a trained machine learning model to the candidate creative based on the extracted features. The trained machine learning model outputs a prediction score for each candidate creative, which represents a likelihood that the target user interacts with the DCO content item having the creative being predicted.

The DCO module 200 ranks 530 the candidate creatives of the same type, e.g., all image creatives received from the content provider system 140. In various embodiments, the ranking occurs based on the prediction scores of the candidate creatives. The DCO module 200 selects 535 a candidate creative for each creative type, where each selected candidate creative has the highest prediction score among all the candidate creatives of the same type.

The DCO module 200 generates 540 a DCO content item composed of the selected candidate creatives for the target user. A different target user of the content item may receive a DCO content item composed of different creatives selected from the same set of creatives provided by the content provider system 140.

Creative Preview Display

Figure 6:
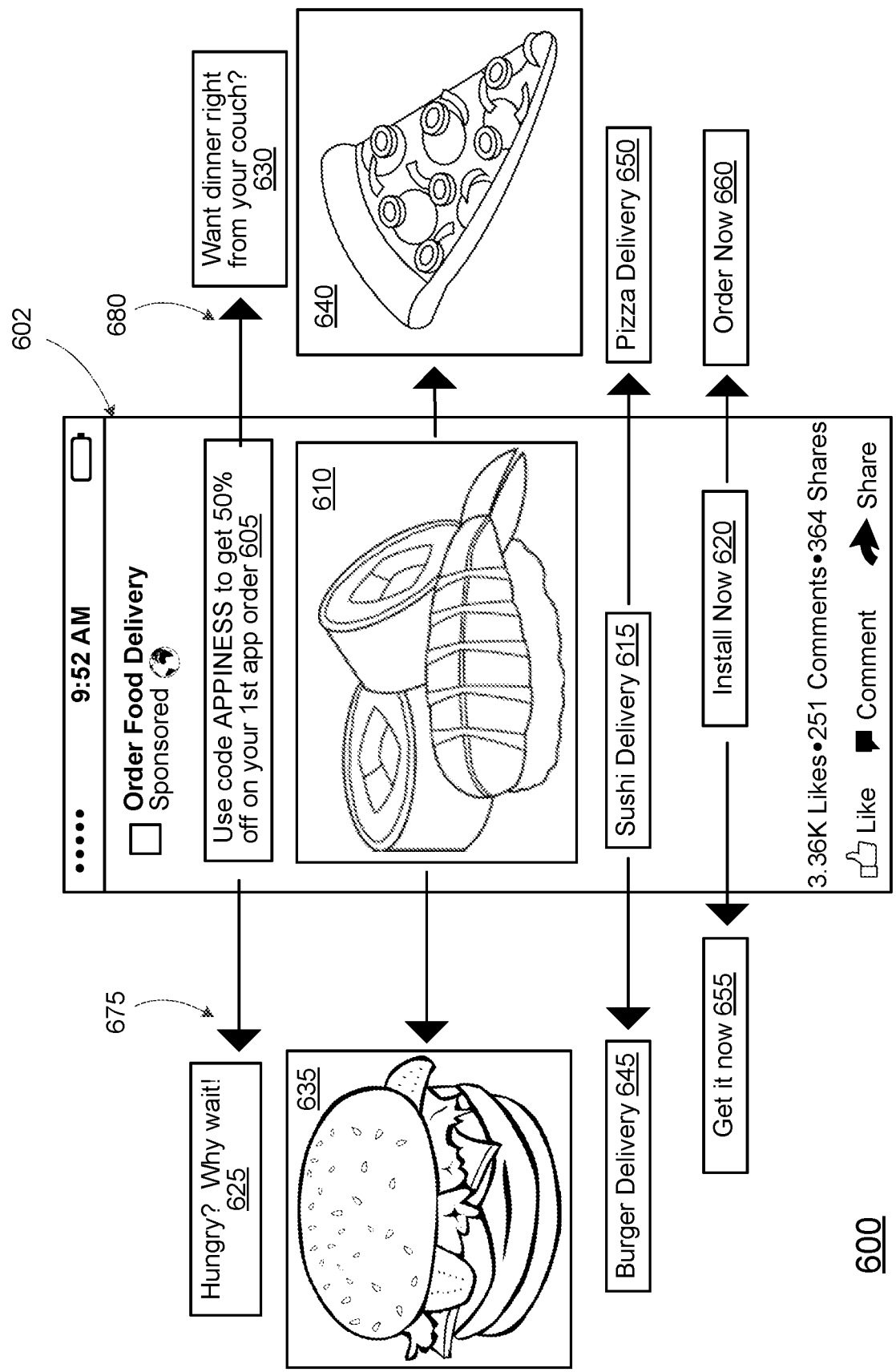
FIG. 6 illustrates a preview interface provided by a creative preview module for previewing content item candidates in accordance with one embodiment.

FIG. 6 illustrates a display of a pseudo-assembled content item provided by the creative preview module 600, in accordance with one embodiment. In one embodiment, before the DCO module 200 assembles various creatives into a content item, the online system 130 provides a content provider, which provided the creatives, a preview of a number of selected pseudo-assembled content items through a preview display interface provided by the creative preview module 600. A pseudo-assembled content item includes one or more creatives to be included in the content item that are placed in their positions in the display interface, but the content item has not yet undergone assembly or creation. The positions of the creatives are defined by one or more placement rules provided by the content provider system 140. Responsive to receiving a user input, the creative preview module 600 may switch out a first creative in the pseudo-assembled content item with a different creative. Thus, a user of the preview display interface can visually preview different content item candidates assembled from different permutations of creatives from the set of creatives of the content item.

As illustrated in FIG. 6, the preview display interface 602 shows a pseudo-assembled content item, which is composed of individual creatives such as a title creative 605, an image creative 610, a descriptive text creative 615, and a call_to_action creative 620. However, one skilled in the art may appreciate that in other embodiments, the pseudo-assembled content item may include additional creatives and have one or more of each type of creative (e.g. two image creatives, two call_to_action creatives). The display 602 may also include additional creatives that are to the left and right of the pseudo-assembled content item that may be swapped in place of a creative that is currently in the pseudo-assembled content item. In some embodiments, the additional creatives include all creatives that were received from the content provider system 140 and provide a user (e.g. content provider) the ability to view any combination of creatives in a pseudo-assembled content item. The user may select the creatives that are to undergo DCO analysis and may choose to remove certain creatives from further analysis.

In various embodiments, the creative preview module 600 presents the pseudo-assembled content item on a graphical user interface (GUI) 602 that is designed to receive input from a user of the GUI. For example, the creative preview module 600 may display input mechanisms that a user of the GUI 602 may click on in order to preview a pseudo-assembled content item composed of different creatives. The input mechanisms may be directionally oriented away from the pseudo-assembled content item and directionally oriented towards a different creative. For example, if a user were to interact with input mechanism 675 (e.g., a backward button), the title creative of "Hungry? Why wait!" 625 will replace the current title creative of "Use code APPINESS to get 50% off on your $1^{st}$ app order" 605 in the pseudo-assembled content item. Similarly, a user interaction with input mechanism 680 (e.g., a forward button) will cause the title creative "Want dinner right from your couch?" 630 to swap into the pseudo-assembled content item.

As described, the input mechanisms 675 and 680 enable the changing of the title creative in the pseudo-assembled content item. However, a user may cause a swap of any creative by interacting with an input mechanism located to the left or right of that creative currently included in the pseudo-assembled content item. In some embodiments, the creative preview module 600 may only allow a creative in the pseudo-assembled content item to be replaced by a different creative that has the same creative type.

In some embodiments, the creative preview module 600 displays a preview of the pseudo-assembled content item and automatically replaces a creative in the content item with a different creative after a threshold amount of time, e.g., 5 seconds. Therefore, previewing the different content items by a content provider may not require any user input from the content provider.

In various embodiments, the pseudo-assembled content item is displayed on the interface 602 in accordance with configurations of a client device used by the content provider. For example, the pseudo-assembled item is displayed as it would appear on an interface belonging to an iPhone, Android, or Microsoft Windows mobile device. A user of the GUI 602 may choose the desired client device platform to view the pseudo-assembled content item and the creative preview module 600 displays the pseudo-assembled content item accordingly.

Figure 7:
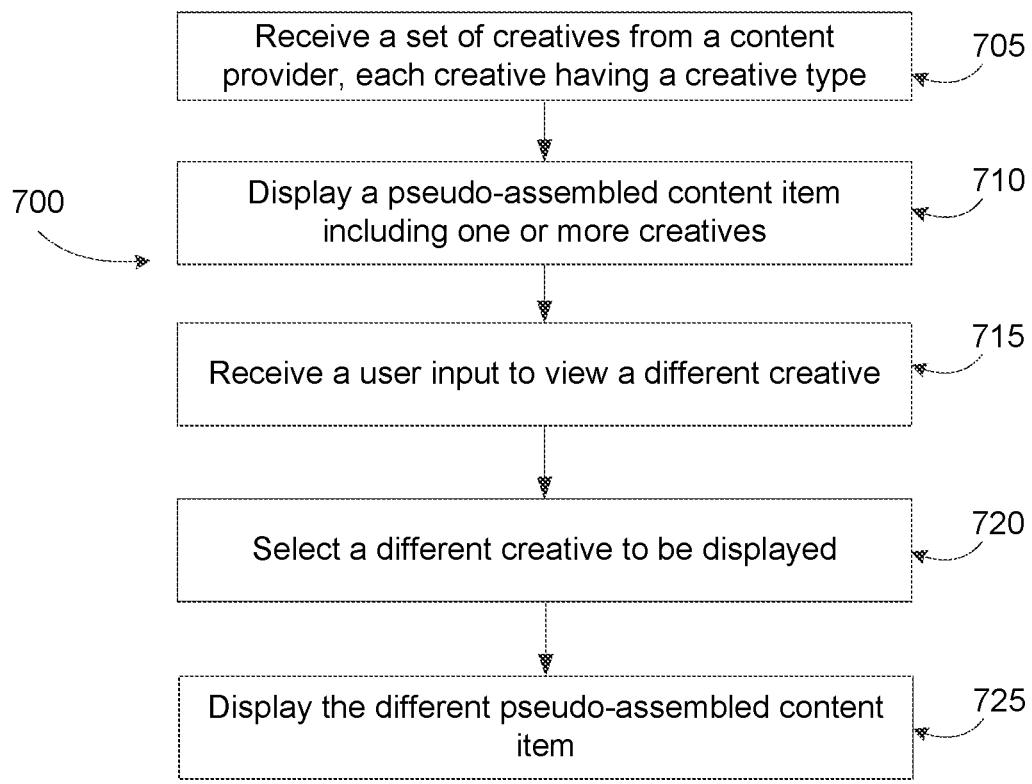
FIG. 7 depicts a flow diagram of previewing pseudo-assembled content items comprising individual creatives in a preview interface provided by the creative preview module according to one embodiment.

FIG. 7 depicts a flow diagram of previewing pseudo-assembled content items comprising individual creatives in a preview interface provided the creative preview module 600. The online system 130 receives 705 a set of creatives from a content provider system 140. Each of the creatives may have a creative type (e.g. image creative, title creative, descriptive text creative, etc.) The online system 130 provides the received set of creatives to the creative preview module 600 for generating pseudo-assembled content items for preview by a user of the content provider system 140. The creative preview module 600 may select a creative for each creative type from the received set of creatives to be included in a pseudo-assembled content item for preview. In various embodiments, a creative may be randomly selected from the set of creatives. The content preview module 600 displays 710 the pseudo-assembled content item that includes the selected creatives in a preview display interface to a user of the content preview module 600 (e.g. a user of the content provider system 140 ).

The creative preview module 600 receives 715 a user input that specifies for a different creative to be included in the pseudo-assembled content item. In various embodiments, the user input is received on an input mechanism displayed by the creative preview module 600, such as a forward or backward button or slider. The creative preview module 600 selects 720 a different creative to be displayed, the different creative having the same creative type as the creative that is to be replaced. The creative preview module displays 725 a different pseudo-assembled content item that includes the different creative. Thus, a different pseudo-assembled content item including the different creative is displayed to an individual of the content provider system 140.

Creative Postview Display

Figure 8:
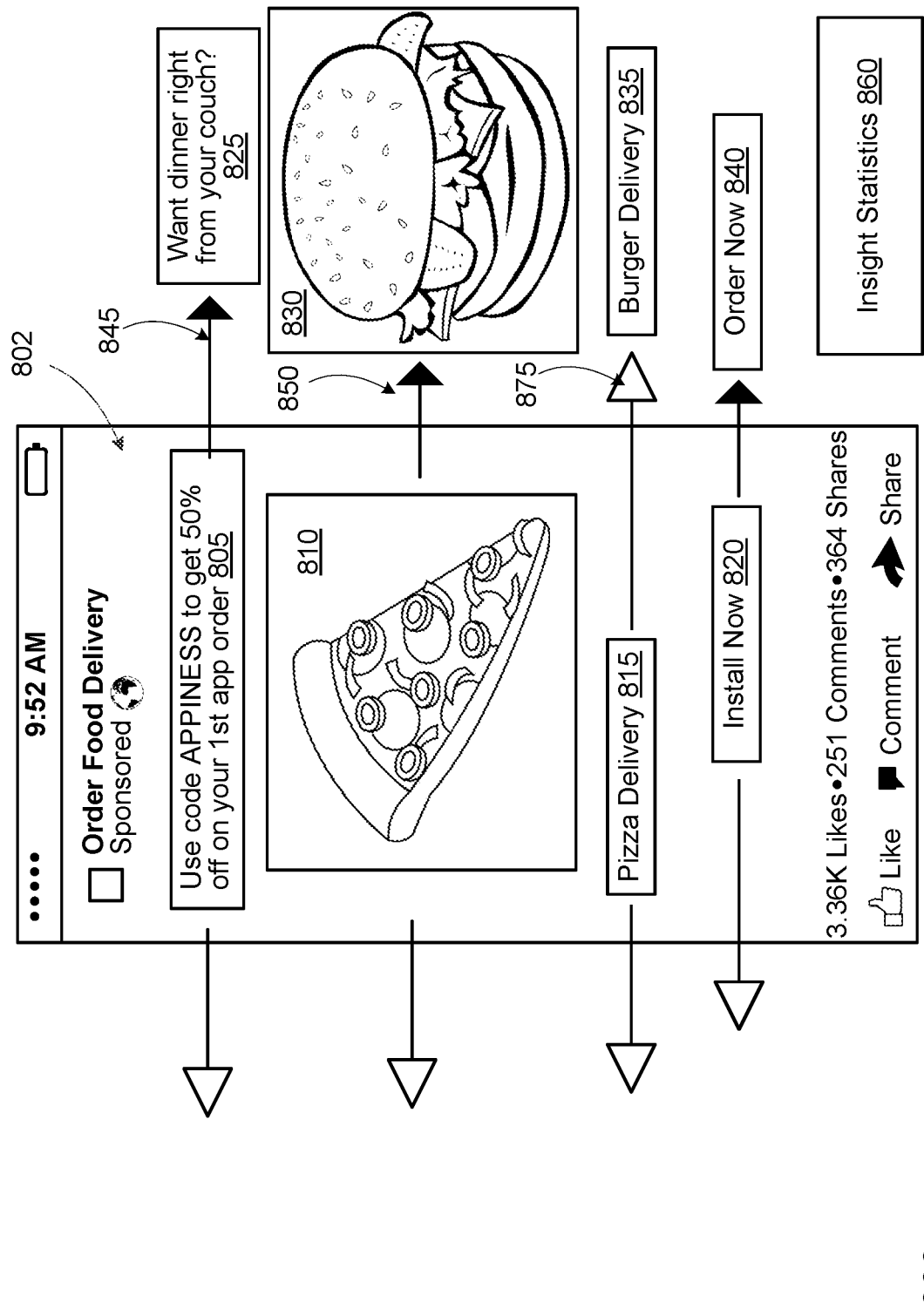
FIG. 8 illustrates a postview interface provided by a creative postview module in accordance with one embodiment.

FIG. 8 illustrates a display of the creative postview module 800, in accordance with one embodiment. In various embodiments, the online system 130 displays a content item generated from the ranked candidate creatives through a creative postview module 800 after an ad campaign or during the running of an ad campaign of the content item. The creative postview module 800 may present the content item through a GUI and allows a user (e.g. content provider) to view the content item that is composed of candidate creatives that satisfy the rules specified by the content provider system 140. The user can choose to provide an input (e.g. a click) to view different content items that are each composed of different combinations of candidate creatives. Additionally, the creative postview module 800 may also present statistical information regarding the content item such as the statistics of advertisement campaigns involving different permutations or combinations of creatives included in the content item (e.g. click through rate, number of "Likes", number of audiences reached by the ad campaign, and viewers' engagement with the individual creatives or the content item as a whole). A user of the GUI provided by the creative postview module 800 may select a particular combination of candidate creatives to generate an assembled DCO content item for presentation to the target user or different target audiences based on the statistics of the content item. The creative postview module 800 can select a number of top ranked creatives for a content item for a target audience and adjust the selected creatives' ranking scores based on the performance statistics associated with the selected creatives. The creative postview module 800 displays the content item composed of different permutations of the selected creatives in an order according to the adjusted ranking scores of the creatives to the content provider.

As illustrated in FIG. 8, the pseudo-assembled content item is composed of individual creatives such as a title creative 805, an image creative 810, a descriptive text creative 815, and a call_to_action creative 820. However, one skilled in the art may appreciate that in other embodiments, the pseudo-assembled content item may include additional creatives and have one or more of each type of creative (e.g. two image creatives, two call_to_action creatives).

The creative postview module 800 receives the ranked candidate creatives from the DCO module 200. In various embodiments, when first initiated, the creative postview module 800 displays a content item that is composed of the optimal candidate creatives selected for a target user. For example, the highest ranked title creative may recite "Use code APPINESS to get 50% off on your $1^{st}$ app order" 805 and is therefore displayed in the pseudo-assembled content item. Similarly, the pizza image creative 810 is the highest ranked image creative, "Pizza Delivery" 815 is the highest ranked description text creative, and "Install Now" 820 is the highest ranked call_to_action creative.

The creative postview module 800 may additionally display insight statistics 860 that provide the user (e.g. advertiser) information regarding the performance, either past performance or expected performance, of the content item composed of the current set of candidate creatives. When the user specifies a different candidate creative to be included in the content item, the insight statistics 860 are updated to display the past or expected performance of the content item composed of the newly selected creatives. For example, the insight statistics 860 may depict the creative score calculated by the creative assembly module 230. The creative score indicates the likely effectiveness of the creatives in the DCO content item. The insight statistics 860 may also depict statistics at the individual creative level, thereby enabling the advertiser to better understand how each individual creative has performed in the past or how each individual creative will likely perform in the next advertising campaign. Statistics may include, but are not limited to, the click-through rate or impression rate of the content item or creative. The content providers can advantageously receive insights into the performance of content items at the creative level as opposed to the full content item level.

The display may also include additional candidate creatives located either to the left or right of the content item that may be swapped in place of a creative that is currently in the content item based on the performance statistics of the candidate creatives. As currently depicted, the title creative has one alternative title creative which recites "Want dinner right from your couch?" 825, the pizza image creative 810 has one alternative which is the burger image creative 830, the description text creative has one alternative which recites "Burger Delivery" 835, and the call_to_action creative has one alternative which recites "Order Now" 840. In various embodiments, each of these alternate creatives is the second ranked creative of their respective creative types in accordance with the performance statistics of the selected creatives. As depicted in FIG. 8, each creative type only has one alternative. It may be appreciated that if there were additional candidate creatives that were ranked (e.g. ranked third), they may also appear in the creative postview module 800 to the left of the content item and can be swapped into the content item if a user desires.

The creative postview module 800 may be a graphical user interface (GUI) 802, that is designed to receive user inputs specifying a desire to swap a different candidate creative into the content item in place of a first candidate creative. In various embodiments, the user inputs are received by the GUI 802 through input mechanisms that are directionally oriented away from the pseudo-assembled content item and directionally oriented towards a different candidate creative. For example, if a user (e.g. advertiser) of the creative postview module 800 interacts with input mechanism 845, then the highest ranked title creative reciting "Use code APPINESS to get 50% off on your $1^{st}$ app order" 805 is removed from the pseudo-assembled content item and the second ranked title creative reciting "Want dinner right from your couch?" 825 replaces the highest ranked title creative in the pseudo-assembled content item.

In some embodiments, the creative postview module 800 displays the content item and automatically replaces a candidate creative in the pseudo-assembled content item with a different candidate creative after a threshold amount of time. Therefore, previewing the different content items may not require any user input.

The creative postview module 800 displays the candidate creatives in a content item while continuing to adhere to the rules received in the creative stream in accordance with the characteristics of a target user. Only candidate creatives may be displayed, meaning that creatives that do not satisfy the rules are not included in the creative postview module 800. Additionally, the creative postview module 800 may continue to ensure that the rules are satisfied as different creatives are swapped in and out of the content item. For example, the creative feed may include group rules that indicate that the pizza image creative 810 is presented with the "Pizza Delivery" 815 description text creative. Similarly, the burger image creative 830 is presented with the "Burger Delivery" 835 description text creative. If a user were to interact with the input mechanism 850, then the burger image creative 830 would replace the pizza image creative 810 and the "Burger delivery" 835 text would simultaneously replace the "Pizza Delivery" 815 text. Thus, the group rules continue to be satisfied even as the creative postview module 800 changes the displayed content item.

In various embodiments, a visually altered input mechanism 875 may be displayed by the creative postview module 800 to indicate a different effect if a user were to interact with the visually altered input mechanism 875. In this embodiment, the visually altered input mechanism 875 is displayed as an open arrow. The open arrow indicates that a user interaction would not yield a change because an alternative candidate creative does not exist or the rules in the creative feed prevent the candidate creative from swapping into the content item.

In various embodiments, the content item is displayed on the interface in accordance with configurations of a client device. For example, the item displays as it would appear on an interface belonging to an iPhone, Android, or Microsoft Windows mobile device. A user of the GUI may choose the desired client device platform to view the pseudo-assembled content item and the creative postview module 800 displays the content item accordingly.

Figure 9:
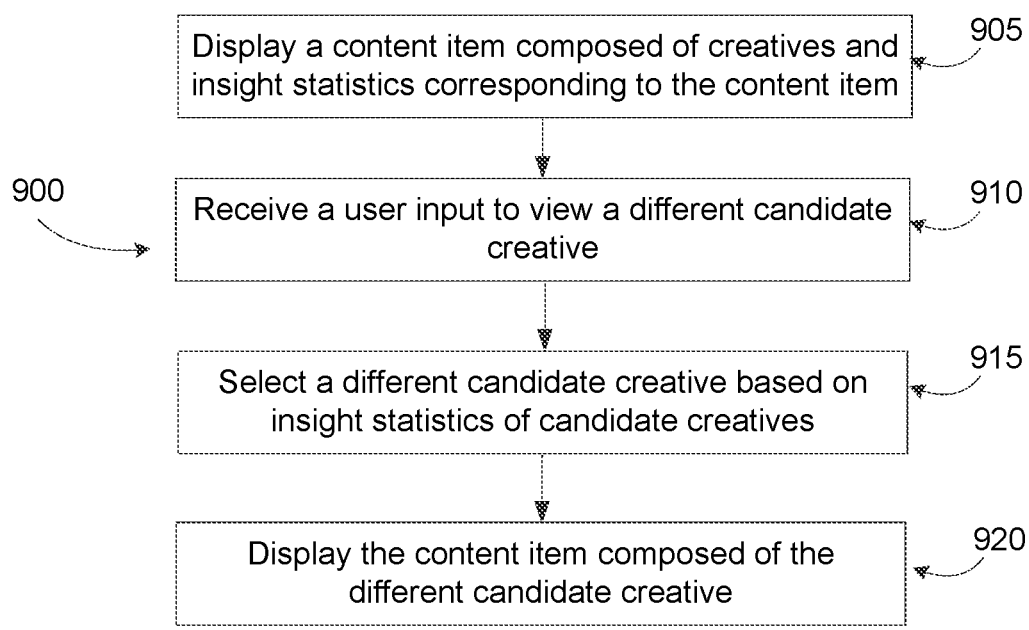
FIG. 9 depicts a flow diagram for generating a postview of content items in a postview interface provided by the creative postview module according to one embodiment.

FIG. 9 is a flow diagram for generating a postview of a content item in the creative postview module 800 according to one embodiment. The creative postview module 800 displays 905 a content item composed of candidate creatives as well as insight statistics corresponding to the content item. For example, insight statistics may be past performance (e.g., click through rate, other advertisement metrics) of an advertising campaign that included the content item. The displayed content item may be the optimal content item for the target user because it includes the optimal creatives of each type previously determined by the DCO module 200. Additionally, the displayed content item satisfies the rules that specify the assembly of the content item.

The creative postview module 800 receives 910 a user input to view a different candidate creative in the content item. In various embodiments, the user input is received on an appropriate input mechanism displayed on a user interface. The creative postview module 800 selects 915 a different candidate creative to be displayed based on the insight statistics associated with each candidate creative. For example, the online system adjusts the ranking information of the candidate creatives based on their associated insight statistics and selects the different candidate creative using the adjusted ranking information. The creative postview module 800 displays 920 the content item including the different candidate creative in the user interface so the user of the creative postview module 800 can view the modified content item. Additionally, the different candidate creative is displayed while continuing to satisfy the received rules.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    receiving, at an online system from a content provider, a plurality of creatives as candidates to be included in a content item, each creative of the plurality of creatives having a creative type;
    providing, by the online system, for display on an interface at a client device, a pseudo-assembled content item, comprising two or more creatives selected from the plurality of creatives, wherein at least two of the creatives are selected from the plurality of creatives based on a group rule, the group rule specifying that an image creative is to be displayed with a particular text creative in the content item, and wherein each selected creative is displayed in a corresponding position in the interface according to a placement rule associated with the pseudo-assembled content item, the position based on historical locations of consumer interaction with creatives in a graphical user interface specified by the placement rule;
    receiving, by the online system from the client device, an indication of a user input through one or more input mechanisms of the interface to view a different creative from the received plurality of creatives;
    selecting by the online system a different creative from the received plurality of creatives based on the user input; and
    providing, by the online system for display on the client device, the pseudo-assembled content item composed of the different creative in the pseudo-assembled content item in place of a previously displayed selected creative.

2. The computer implemented method of claim 1, wherein the pseudo-assembled content item composed of a number of creatives selected from the plurality of creatives is a candidate content item which is to be presented to a target user.

3. The computer implemented method of claim 1, wherein the creative type of each creative is one of an image, video, title, body, call_for_action_type, universal resource link (URL), description and caption.

4. The computer implemented method of claim 1, wherein at least one creative is selected randomly.

5. The computer implemented method of claim 1, wherein the pseudo-assembled content item is displayed on the interface in accordance with configurations of a client device used by the content provider to view the pseudo-assembled content item.

6. The computer implemented method of claim 1, wherein the one or more input mechanisms is a directional arrow located on the interface.

7. The computer implemented method of claim 1, wherein the different creative and the previously displayed selected creative each have the same creative type.

8. The computer implemented method of claim 1, further comprising:
    displaying additional creatives from the plurality of creatives located to the left of the pseudo-assembled content item in the interface, the additional creatives not among the selected creatives.

9. The computer implemented method of claim 1, further comprising:
    displaying additional creatives from the plurality of creatives located to the right of the pseudo-assembled content item in the interface, the additional creatives not among the selected creatives.

10. A non-transitory computer-readable medium comprising computer program instructions, the computer program instructions when executed by a processor of a computer device causes the processor to perform the steps including:
    receiving, at an online system from a content provider, a plurality of creatives as candidates to be included in a content item, each creative of the plurality of creatives having a creative type;
    providing, by the online system, for display on an interface at a client device, a pseudo-assembled content item, comprising two or more creatives selected from the plurality of creatives, wherein at least two of the creatives are selected based on a group rule, the group rule specifying that an image creative is to be displayed with a particular text creative in the content item, each selected creative is displayed in a corresponding position in the interface according to a placement rule associated with the pseudo-assembled content item, the position based on historical locations of consumer interaction with creatives in a graphical user interface specified by the placement rule;
    receiving, by the online system from the client device, an indication of a user input through one or more input mechanisms of the interface to view a different creative from the received plurality of creatives;
    selecting by the online system a different creative from the received plurality of creatives based on the user input; and
    providing, by the online system for display on the client device, the pseudo-assembled content item composed of the different creative in the pseudo-assembled content item in place of a previously displayed selected creative.

11. The non-transitory computer-readable storage medium of claim 10, wherein the pseudo-assembled content item composed of a number of creatives selected from the plurality of creatives is a candidate content item which is to be presented to a target user.

12. The non-transitory computer-readable storage medium of claim 10, wherein the creative type of each creative is one of an image, video, title, body, call_for_action_type, universal resource link (URL), description and caption.

13. The non-transitory computer-readable storage medium of claim 10, wherein at least one creative is selected randomly.

14. The non-transitory computer-readable storage medium of claim 10, wherein the pseudo-assembled content item is displayed on the interface in accordance with configurations of a client device used by the content provider to view the pseudo-assembled content item.

15. The non-transitory computer-readable storage medium of claim 10, wherein the one or more input mechanisms is a directional arrow located on the interface.

16. The non-transitory computer-readable storage medium of claim 10, wherein the different creative and the previously displayed selected creative each have the same creative type.

17. The non-transitory computer-readable storage medium of claim 10 further comprising computer program instructions, the computer program instructions when executed by a processor of a computer device causes the processor to perform the steps including:
displaying additional creatives from the plurality of creatives located to the left of the pseudo-assembled content item in the interface, the additional creatives not among the selected creatives.

18. The non-transitory computer-readable storage medium of claim 10 further comprising computer program instructions, the computer program instructions when executed by a processor of a computer device causes the processor to perform the steps including:
displaying additional creatives from the plurality of creatives located to the right of the pseudo-assembled content item in the interface, the additional creatives not among the selected creatives.

19. The computer implemented method of claim 1, wherein the two or more creatives from the plurality of creatives are further selected based on a mutex rule specifying two or more creatives that are not to be included in the same content item.

20. The computer implemented method of claim 1, wherein the two or more creatives from the plurality of creatives are further selected based on a set of rules associated with consumer characteristics.

21. The computer implemented method of claim 1, wherein the two or more creatives from the plurality of creatives are further selected based on a prediction score, the prediction score comprising a likelihood that a target user will interact with the content item that includes the creative being predicted.

22. The computer implemented method of claim 21, wherein the prediction score is determined using a machine learning model, the machine learning model trained using feature vectors derived from target user information and creative information.

* * * * *